Patented Dec. 12, 1922.

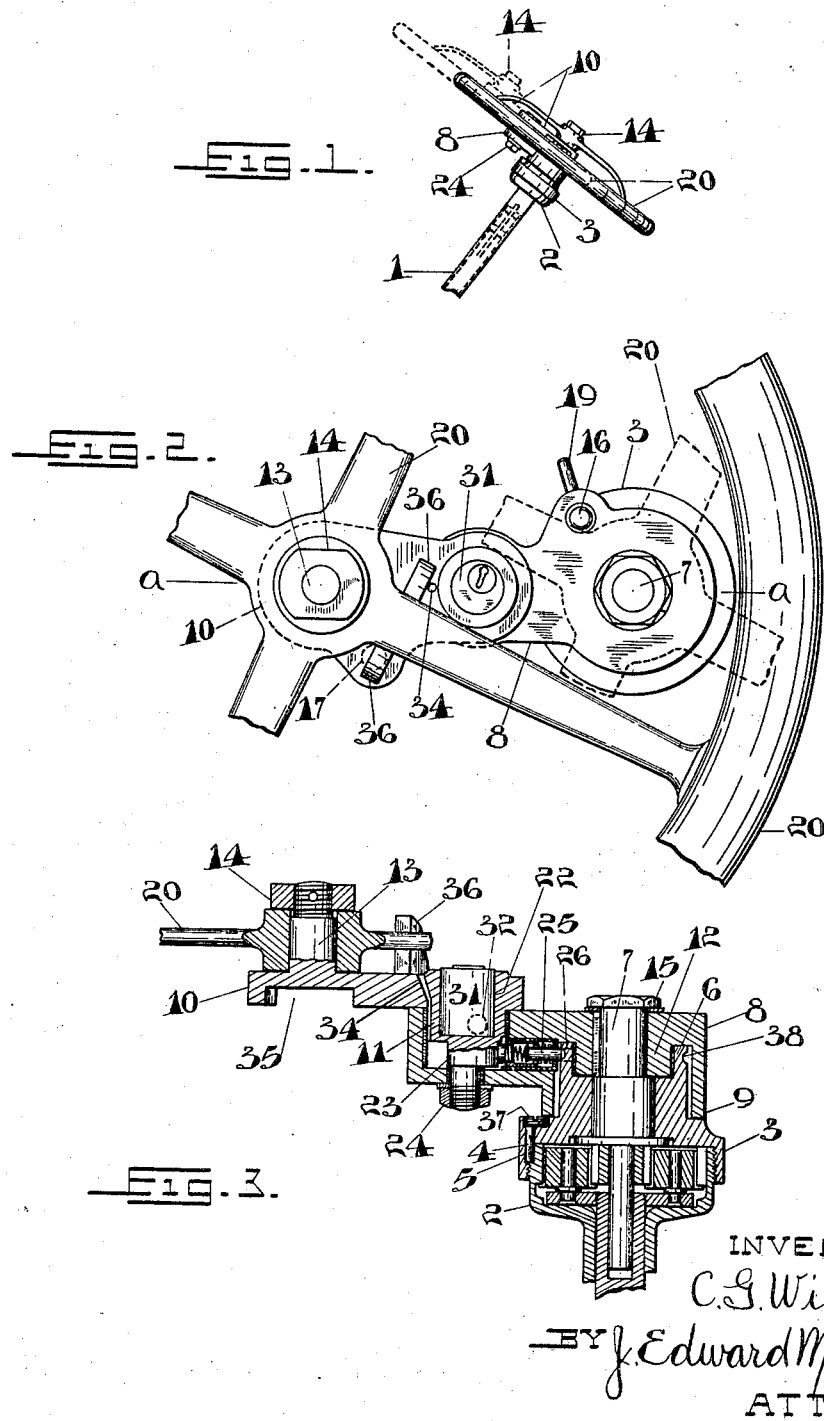

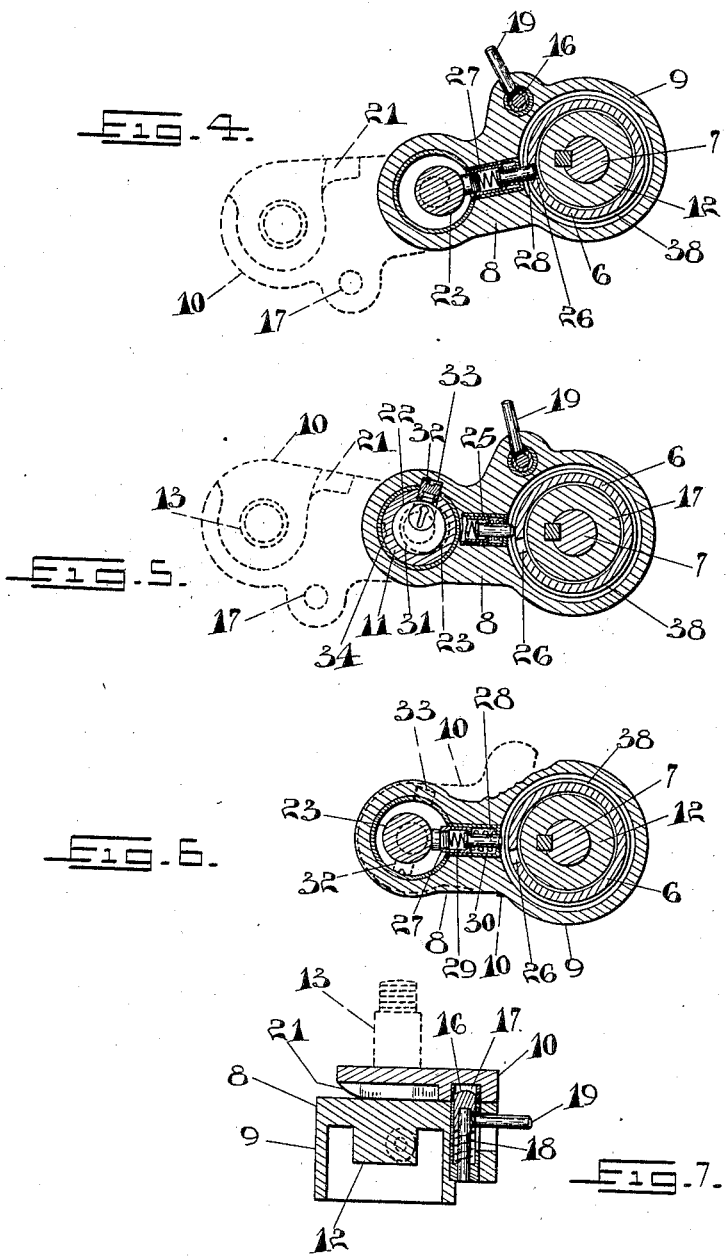

1,438,734

UNITED STATES PATENT OFFICE.

CHARLES GEORGE WILLETT, OF TORONTO, ONTARIO, CANADA.

STEERING APPARATUS FOR MOTOR VEHICLES.

Application filed April 27, 1921. Serial No. 465,030.

*To all whom it may concern:*

Be it known that I, CHARLES GEORGE WILLETT, of the city of Toronto, in the county of York, Province of Ontario, Canada, a subject of the King of Great Britain, have invented certain new and useful Improvements in Steering Apparatus for Motor Vehicles, of which the following is a specification.
This invention relates to improvements in steering wheels for motor vehicles, and my object is to devise a wheel, which, when the driver desires to get out of the car, may be swung up out of the way in order to give the driver greater room to get out of his seat.

A further object is to provide in connection with the wheel locking means for rendering the steering mechanism inoperative, which locking means will be brought into operation by any turning movement of the steering wheel when it is in raised position.

I attain my objects by means of the constructions hereinafter described and illustrated in the accompanying drawings in which—

Fig. 1 is a side elevation of a steering wheel constructed in accordance with my invention, the wheel being shown in dotted lines in raised position;

Fig. 2 a plan view, partly broken away, showing the steering wheel in full lines in inoperative position and in dotted lines in operative position;

Fig. 3 a section on the line *a—a* in Fig 2;

Fig. 4 a sectional detail in plan showing part of the locking means in completely locked position;

Fig. 5 a view similar to Fig. 4 showing the same parts in partially locked position;

Fig. 6 a view similar to Fig. 4 showing the same parts in unlocked position; and Fig. 7 a sectional detail showing the means for locking the wheel supporting arms in steering position.

In the drawings like numerals of reference indicate corresponding parts in the different figures.

1 is the steering column of a motor car.
To the top of the column is secured the usual housing 2 in which is mounted the usual gearing for turning the steering spindle. On the housing is mounted the cover 3. The housing, in the constrution shown, is provided with an external thread and the cover 3 with an internal thread in order that the cover may be screwed on the housing. The cover is then suitably locked on the housing in order that the cover cannot be unscrewed. While various methods of locking the cover on the housing may be devised, I show as one suitable form a pin 4 inserted in a hole 5 in the cover and extending down into the side of the housing, one half of the pin engaging with the inner surface of the cover and the other half engaging with the outer surface of the housing. The upper end of the hole 5 is closed by a suitable screw plug 37 so that the pin 4 cannot be removed.

On the upper side of the cover 3 and integral therewith is formed a bushing 6. In the cover and bushing is suitably journalled the steering pin 7, which has the usual gear suitably secured to its lower end meshing with the gearing in the housing 2.

The construction heretofore described relates to the application of my device to a car of the Ford type, but it will be understood that my device is equally applicable to cars of other makes, the important point being the provision of the bushing 6, or suitable part corresponding thereto, which is fixedly connected at the upper end of the steering column, and having the steering pin 7, or in some cases the steering spindle itself, journalled therein.

Instead of securing the steering wheel 20 on this pin 7 or on the end of the steering spindle as is ordinarily the case, I mount on the pin 7 an arm member 8, which will be suitably keyed to one another to prevent the rotation of the member 8 relative to the pin 7, and the member 8 will be retained on the pin 7 by means of a nut 15. The member 8 will be provided with a depending flange 9 which will extend down the side of the bushing 6 to a point adjacent the cover 3. When the member 8 is in position with the flange against the top of the cover, it will be impossible to remove the screw plug 37.

The member 8 will also be provided with an inner depending flange 12 which extends down within the bushing 6. It will thus be seen that the member 8 has a very large bearing surface against the bushing 6 so that there will be no danger of one part rocking on the other.

On the member 8 adjacent its other end is pivoted the arm member 10, by means of a pin 11 secured adjacent one end of the member 10. Adjacent the other end of the arm member 10 is secured the upwardly extending pin 13, and on this pin is secured the steering wheel 20, which is held in place by a suitable nut 14. The steering wheel may be suitably keyed on the pin 13, or the wheel may be prevented from rotation by forming lugs 36 on the upper surface of the member 10 to engage the sides of one of the spokes of the wheel.

To lock the member 10 in position with the pin 13 in alinement with the pin 7, I mount in the member 8 a plunger 16 adapted to engage in a hole 17 in the underside of the member 10. This plunger will be provided with a suitable spring 18 tending to hold the plunger extended. The plunger will also be provided with a suitable handle 19 extending through the side of the member 8 by means of which the plunger 16 may be retracted to allow the member 10 to be swung.

To allow the member 10 to swing back to the steering position without the necessity of operating the handle 19, I taper off the edge of the member 10 at 21 so that the plunger 16 will automatically be retracted as the member 10 swings back to steering position, when as soon as the hole 17 comes into alinement with the plunger the plunger will spring into the hole and thus prevent further movement of the member 10 until the handle 19 is operated.

With the construction above described I find that I can combine suitable means for locking the steering mechanism so that it will be inoperative. For this purpose I form on the pin 11 an enlarged hollow portion 22 and an eccentric portion 23, while the small end of the pin extends through the under surface of the member 8 and has the nut 24 threaded thereon.

Mounted in the member 8 is the spring pressed plunger 25 normally extending into the bearing in the member in which the pin 11 is journalled. As the pin 11 is rotated in the bearing, the eccentric portion engages the plunger 25 and forces it forward through an opening in the bearing in the member 8 for the bushing 6, which bushing is provided with a hole 26 to receive the end of the plunger and thus lock the member 8 from rotation relative to the bushing 6.

The plunger 25, it will be noted, is of special construction. It consists of a hollow member 27. Into this member extends a pin 28 normally held extended in the member 27 by means of a spring 29 located therein, and a second spring 30 is mounted on the pin 28. When the member 27 is engaged by the eccentric 23, the member 27 is forced up on the pin 28, compressing the spring 29, until the hole 26 is in alinement with the pin 28, when the spring 29 immediately forces the pin 28 into the hole 26.

Mounted in the end of the member 10 and in the hollow portion 22 is a lock 31. The keeper 32 of this lock is normally held extended through the side of the portion 22 by means of a suitable spring, and in the side of the bearing for the pin 11 in the member 8 is formed a hole 33 into which the keeper is adapted to engage, which keeper can only be retracted by means of a key operating the lock in the usual way.

While a key-operated lock is shown, it will be understood, of course, that I may use a dial-operated lock if such is preferred.

Through the member 10 is formed an oil hole 34, which leads down beside the pin 11 and it will be noted that the parts are so arranged that oil poured into this hole will percolate around all the parts which move relative to one another.

It will also be noted that the member 10 is cut away at 35. This is to enclose the nut 15 to prevent the use of a tool to remove the nut, and also permits the cutting down of the height of the device.

The device will usually be made of aluminum or similar material, but all parts subject to wear, such, for example, as surrounding the hole 17, surrounding the plungers 16 and 25, and surrounding the pin 11, bushings of case-hardened steel will be inserted, and further the plungers 16 and 25, the keeper 32, and other movable parts will also be formed of similar material.

The operation of the device is as follows. When the steering wheel is in operative position, the wheel will occupy the position shown in dotted lines in Fig. 2 with the member 10 exactly over the member 8 and the pin 13 in alinement with the pin 7. When the driver desires to leave the car, he presses down the handle 19 to retract the plunger 16 from the hole 17, when the member 10 is free to swing up to the position shown in full lines in Fig. 2 and in dotted lines in Fig. 1, the keeper 32 of the lock engaging in the hole 33. Up to this point the steering mechanism is free to be operated and the driver may, if desired, leave the parts in this position, as but a slight turning movement of the steering wheel will bring the plunger 25 into engagement with the hole 26 in the bushing 6, when further operation of the steering mechanism is impossible. To release the parts, it is merely necessary to operate the key in the lock 31 in the usual way to retract the keeper 32, and as the member 10 is swung, the rotation of the eccentric permits the spring 30 to retract the plunger 25 from engagement in the hole 26.

From the construction described it will be seen that I have devised a construction which will satisfactorily attain the objects of my invention as set out in the preamble of this specification. It will also be understood that various changes may be made in the details of my construction without departing from the spirit of my invention.

It will be noted that an annular groove 38 is formed in the bushing 6. The object of this groove is to prevent anyone, when the parts are in extended but not completely locked position as shown in Fig. 5, from removing the nut 15 and thus removing the arm 8 from the bushing 6.

My device, it will be noted, may be easily attached to any existing cars, and the present steering wheel may be removed from the pin 7 and secured on the pin 13, or a new wheel substituted as may be desired.

It will also be noted that the locking operation is entirely automatic, the use of keys during the locking operation being entirely avoided.

What I claim as my invention is:—

1. In steering apparatus for motor cars, the combination of a steering spindle; an arm secured at one end on said steering spindle; a second arm one end of which is pivoted adjacent the free end of the first mentioned arm; a spring actuated plunger mounted in one of said arms, the other arm having an opening therein with which the plunger is adapted to engage and also having a bevelled portion adapted to force back the plunger to engage it in said opening; key-releasable means adapted to automatically lock said second mentioned arm when it reaches its extended position; and a steering wheel secured adjacent the free end of the second mentioned arm.

2. In steering apparatus for motor cars, the combination of a steering column; a bushing secured on said column; a steering spindle rotatable within said bushing; an arm secured at one end to said spindle but normally rotatable relative to said bushing; a second arm one end of which is pivoted adjacent the free end of the first mentioned arm; means for locking the second mentioned arm in extended position; means for locking the first mentioned arm from rotation relative to the bushing; and a steering wheel secured adjacent the free end of the second mentioned arm.

3. In steering apparatus for motor cars, the combination of a steering column; a bushing secured on said column; a steering spindle rotatable within said bushing; an arm secured at one end to said spindle but normally rotatable relative to said bushing; a second arm one end of which is pivoted adjacent the free end of the first mentioned arm; means for locking the second-mentioned arm when the axes of the steering spindle and steering wheel are in substantial alinement; means for locking the second mentioned arm in extended position; means for locking the first mentioned arm from rotation relative to the bushing; and a steering wheel secured adjacent the free end of the second mentioned arm.

4. In steering apparatus for motor cars; the combination of a steering column; a bushing secured on said column; a steering spindle journalled in said bushing; an arm secured at one end to said spindle but normally rotatable relative to said bushing; a second arm one end of which is pivoted adjacent the free end of the first mentioned arm; means operable by the swinging of the second mentioned arm on its pivot for locking the first mentioned arm from rotation relative to the bushing; and a steering wheel secured adjacent the free end of the second mentioned arm.

5. In steering apparatus for motor cars; the combination of a steering column; a bushing secured on said column; a steering spindle journalled in said bushing; an arm secured at one end to said spindle but normally rotatable relative to said bushing; a second arm one end of which is pivoted adjacent the free end of the first mentioned arm; a plunger mounted in the first mentioned arm adapted to engage said bushing but normally held out of engagement therewith, the pivot of the second mentioned arm having an eccentric portion formed thereon by means of which said plunger is operated; and a steering wheel secured adjacent the free end of the second mentioned arm.

Signed at Toronto, Canada, this 19th day of April, 1921.

CHARLES GEORGE WILLETT.